Sept. 4, 1956
O. N. GREDELL
2,761,300
POWER DRIVEN AUGER
Filed Aug. 5, 1954
2 Sheets-Sheet 1
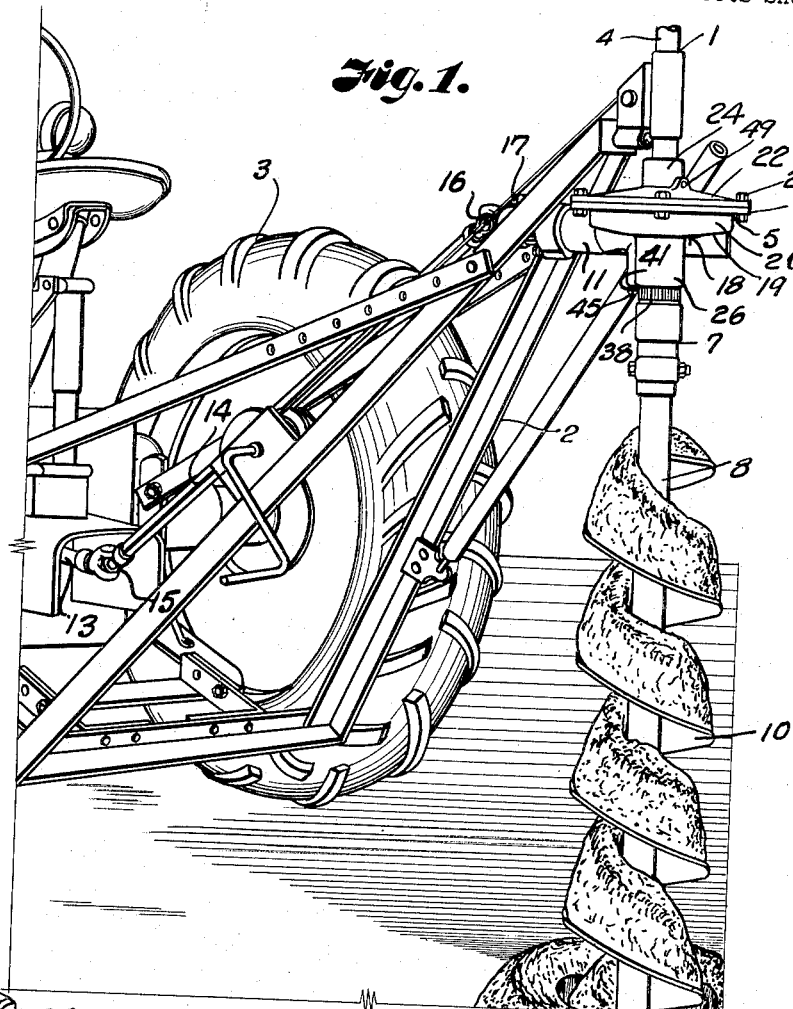
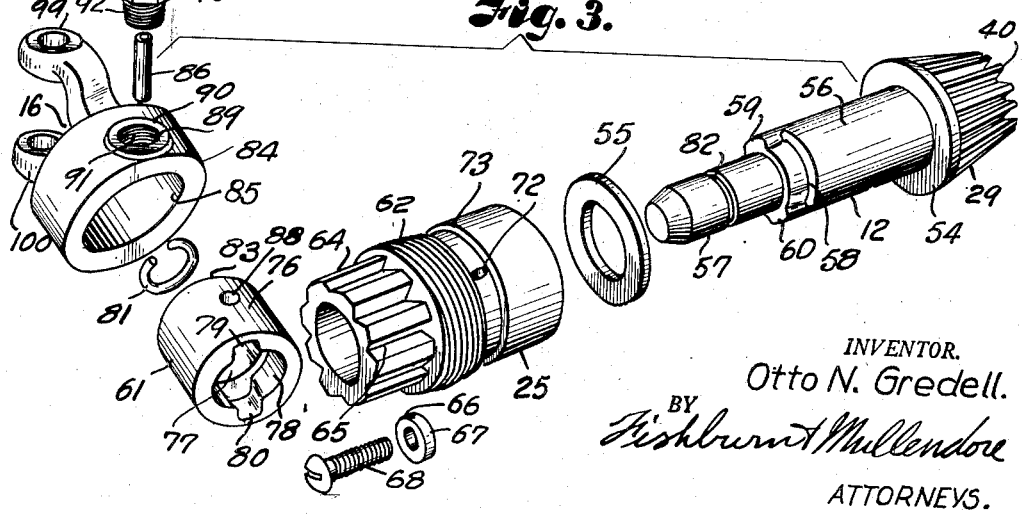
INVENTOR.
Otto N. Gredell.
BY
Fishburn Mullendore
ATTORNEYS.

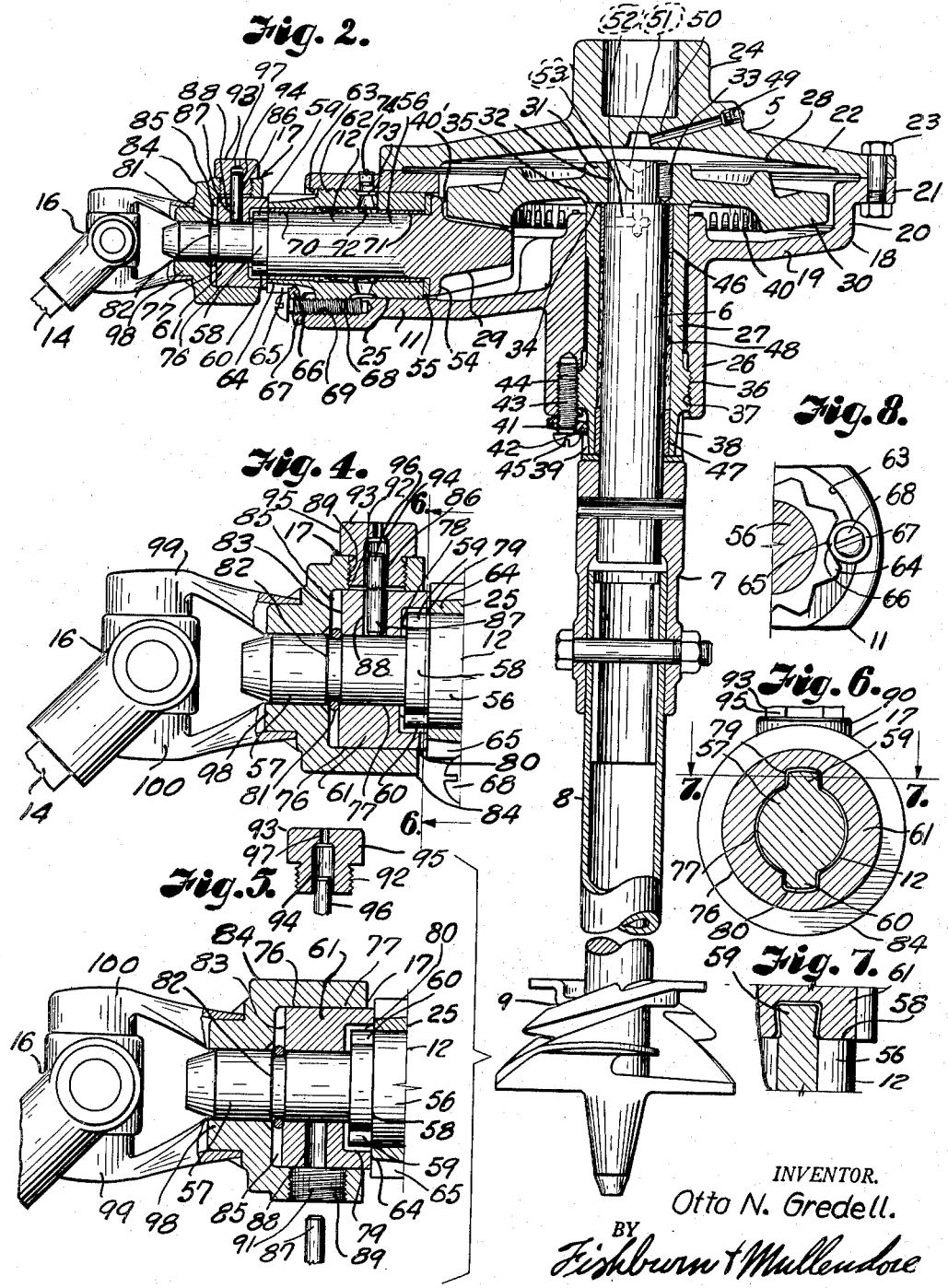

United States Patent Office

2,761,300
Patented Sept. 4, 1956

2,761,300

POWER DRIVEN AUGER

Otto N. Gredell, Kansas City, Mo., assignor, by mesne assignments, to Standard Steel Works, Inc., North Kansas City, Tex., a corporation of Texas Application August 5, 1954, Serial No. 447,982

9 Claims. (Cl. 64—28)

This invention relates to a power driven auger of a type used in boring into the earth as for example when setting posts, poles or the like, or in making tests of the depth and nature of earth formations.

Such augers are usually mounted as an attachment to tractors and are driven from the power take-off thereof. Consequently, they are especially desired by farmers and others as labor saving devices, however, such augers are subject to severe working conditions and the problem has been to provide a strong, rugged and serviceable construction that may be produced and sold at low cost.

Therefore, the principal object of the present invention is to provide an auger that is of simple and highly serviceable construction and yet may be produced and sold at relatively low cost.

Further objects of the invention are to provide a drive for such augers that is easily assembled and adjusted to keep the pinion and drive gears in proper meshing relation; to provide a yieldable safety connection between the drive shaft and the pinion gear shaft which is capable of shearing when excess loads are applied to the auger so as to prevent breakage of more vital parts of the auger mechanism; to provide a safety connection that is easily replaced without the use of hammers or punches when removing the sheared parts of the safety connection; to provide a unitary pinion gear and shaft that is connected with the drive shaft through drive and thrust collars that are connected together by a shear pin to avoid a direct connection of the shear pin with the pinion shaft; and to provide a structure requiring a minimum of machining operations in the manufacture thereof.

In accomplishing these and other objects of the invention I have provided improved structure the preferred form of which is illustrated in the accompanying drawings wherein:

Fig. 1 is a perspective view of an auger embodying the features of the present invention and showing the mounting thereof on a tractor and the driving connection with the power take off of the tractor.

Fig. 2 is an enlarged vertical section through the auger and particularly illustrating the mounting of the drive gears and the safety connection between the pinion and driving shafts.

Fig. 3 is a perspective view of the pinion gear, bearing sleeve, the thrust and drive collars, and safety connection, the parts being shown in spaced apart relation to better illustrate the construction thereof.

Fig. 4 is an enlarged fragmentary sectional view of the safety connection showing the pin sheared as a result of an excessive strain applied to the auger.

Fig. 5 is a similar view but illustrating the simple manner of removing the parts of the safety connection.

Fig. 6 is a cross section on the line 6—6, Fig. 4.

Fig. 7 is a fragmentary section on the line 7—7, Fig. 6.

Fig. 8 is a fragmentary cross section through the pinion gear shaft illustrating the manner of locking the bearing sleeve in adjusted position.

Referring more in detail to the drawings:

1 designates an auger mechanism embodying the features of the present invention and which includes a supporting frame 2 that is pivotally adjustable on a tractor 3. The frame 2 slidably supports a guide rod 4 having connection with a gear housing 5. Rotatably mounted in the gear housing in coaxial alignment with the guide rod 4, is a driven shaft 6 that is connected through a coupling 7 with an auger shaft 8. The auger shaft 8 carries a drill bit 9 for digging into the soil and a spiral flight 10 for bringing the soil to the top of the ground when the augur is in operation, as shown in Fig. 1, for digging a post hole or the like.

The gear housing 5 includes a lateral tubular extension 11 rotatably mounting a pinion shaft 12 that is connected with the power take off 13 of the tractor through a telescoping drive shaft 14, the drive shaft 14 being connected to the power take off through a universal joint 15 and with the pinion shaft through a universal joint 16 and a safety connection 17.

The gear housing 5 and lateral extension 11 includes a relatively dish-shaped lower section 18 having a bottom 19 and an annular wall 20 carrying a lateral annular flange 21 to which a cover section 22 is attached by fastening devices such as bolts 23. The bolts 23 extend through openings in the margin of the cover and through registering openings in the flange 21 as shown in Fig. 2. The cover section 22 has an axial boss 24 to which the guide rod 4 is suitably connected. The lateral extension 11 mounts an adjustable bearing sleeve 25 which journals the pinion shaft 12.

The section 18 of the gear housing also includes a hub or collar 26 containing a bearing sleeve 27 in which the driven shaft 6 is rotatably mounted. The sections 18 and 22 of the gear housing form a closed compartment 28 containing a pinion gear 29 on the pinion shaft 12 and a driven gear 30 on the shaft 6. The driven gear 30 includes a hub 31 that is mounted on a reduced extension 32 of the driven shaft 6 and is connected in driving relation therewith by means of a lock pin 33 with the under face 34 of the hub 31 bearing upon the end 35 of the bearing sleeve 27. The bearing sleeve 27 is slidably rotatable within the collar 26 and includes an externally threaded portion 36 which connects with an internally threaded portion 37 of the collar 26. The bearing sleeve also includes an externally projecting end 38 having an annular series of longitudinal grooves 39 of substantially V shape cross section to form a peripheral grip by which the bearing sleeve may be turned within the collar 26 for adjusting the position of the teeth 40 of the driven gear 30 with respect to the teeth 40' of the pinion gear 29 as later described. The bearing sleeve 27 is retained in adjusted position relative to the collar 26 by a lock washer 41 having a side edge 42 thereof engaging in one of the grooves 39 after an adjustment has been made, the washer being retained in a tilted or slanted position by a screw 43 that is threaded into a socket 44 extending inwardly from the face of the collar 26. The screw has a slotted head 45 for retaining the washer (see Fig. 2). The ends of the bearing sleeve may be provided with bearing liners 46 and 47 of bearing material and the space therebetween may contain a felt wicking 48 to retain the lubricant for the bearing surfaces. The lubricant is supplied to the wicking 48 through a fitting 49 that is contained in the outer end of an oil passageway 50 provided within the cover section of the gear housing and which terminates over an axial conical cavity 51 in the end of the driven shaft 6 to direct the lubricant through an axial bore 52 that connects with a lateral port 53 discharging onto the surface of the bearing liner 46, as shown in Fig. 2, and from which it passes to the wicking 48 and to the other bearing surface of the liner 47.

The pinion 29 and shaft 12 preferably comprise an integral unit with the pinion 29 being formed on the inner end of the shaft 12 and provided with an inner shroud 54 to strengthen the teeth 40' of the pinion and to engage a thrust washer 55 that is inserted between the shroud 54 and the inner end of the bearing sleeve 25 as shown in Fig. 2.

The pinion shaft includes a main body or bearing portion 56 substantially conforming with the length of the bearing sleeve 25. Formed integrally with the outer end of the bearing portion 56 is a reduced terminal 57 that joins with the bearing portion 56 in a stepped shoulder 58 provided with diametrically disposed lugs 59 and 60 that form a driving connection with a thrust collar 61 as shown in Fig. 6.

The bearing sleeve 25 substantially conforms in construction to the bearing sleeve 27 previously described and includes an exteriorly threaded portion 62 that engages an internally threaded portion 63 of the housing extension 11. The outer end 64 of the bearing sleeve 27 projects from the extension of the housing and is provided with an annular series of V-grooves 65, one of which is to be engaged by the arcuate side of a locking washer 67 that is canted between the end of the housing extension and the groove engaged thereby. The washer is held in canted position by a screw 68, which is threaded into a socket 69 extending inwardly from the outer face of the housing extension to bind the parts together (see Figs. 2 and 8). The bearing sleeve 25 is also preferably provided with bearing liners 70 and 71 at the respective ends thereof, and the space therebetween contains a felt wick to retain the lubricant for the bearing surface thereof. The lubricant is supplied to the wick through radial ports 72 in the bearing sleeve that connects with an annular groove 73 in the outer periphery of the bearing sleeve so that the ports 72 will at all times connect with a lubricant fitting 74 mounted in the housing extension as shown in Fig. 2.

A thrust collar 61, that is mounted on the reduced extension, has a cylindrical exterior 76 and an axial bore 77 to form a sliding fit for the collar on the terminal 57 of the pinion shaft. The inner end of the thrust collar has a counterbore 78 to accommodate the step portion 58 of the pinion shaft and extending from the face of the counterbore are diametrically opposed grooves 79 and 80 that accommodate therein the lugs 59 and 60 previously described. The thrust collar 61 is retained in position on the terminal of the pinion shaft by means of a lock ring 81 that seats within an annular groove 82 in the terminal of the pinion shaft 12 whereby the lock ring 81 engages the outer end face 83 of the thrust collar and cooperates with the annular shoulder 58 on the pinion shaft in retaining the thrust collar 61 therebetween.

The universal joint 16 includes a collar 84 having a socket 85 for accommodating therein the thrust collar 61. The collar 84 thus surrounds the thrust collar for mounting the safety connection 17. The safety connection includes a shear pin 86 by which the collars 61 and 84 are interconnected as now to be described.

The shear pin 86 is formed of material of predetermined hardness so that the pin is adapted to shear when a certain resisting force is applied to the bit of the auger, as for example, when the blades of the bit strike a rock or other obstruction. The shear pin 86 has one end 87 that is freely engaged within a radial opening 88 formed in the thrust collar 61 and which registers with a substantially larger radial opening 89 in the collar 84. The opening 89 extends through a boss 90 (Fig. 3) on the collar 84 and has internal threads 91 for engaging the threads 92 of a shear pin retainer 93. The shear pin retainer 93 has an axial bore 94 that terminates within a polygonal-shaped head 95 of the retainer to contain an end 96 of the shear pin 86 when it is screwed into the opening 89 of the collar 84. The head 95 of the retainer 93 may be provided with a smaller axial opening 97 extending therethrough to connect with the bore 94. The collar 84 has an extension 98 carrying ears 99 and 100 of the universal joint 16.

To use the auger, it is mounted on the rear of the tractor 3 and the shaft 14 is connected through the universal joint 15 with power take off shaft 13 of the tractor. The tractor is moved to the drilling site where the bit is lowered into contact with the ground and the clutch of the power take off (not shown) is engaged to rotate the shaft 14 for driving the universal joint collar 84 and thrust collar 61 through the shear pin 86. The thrust collar 61 in turn drives the pinion shaft 12, within the bearing sleeve 25, through the lugs 59 and 60 that engage in the notches 79 and 80 of the thrust collar so as to rotate the pinion shaft 12 and the pinion gear 29. The pinion gear 29 drives the gear 30 which in turn drives the shaft 6, auger shaft 8, and bit 9 so that the bit bores into the soil and the flight 10 on the auger shaft 8 elevates the loosened soil to the top of the ground as shown in Fig. 1.

Assuming that the bit 9 should meet an obstruction such as a rock or the like that places an undue stress on the driving mechanism, the resistance to rotation of the auger and the power tending to rotate it will effect shearing of the pin 86 at substantially between the periphery of the thrust collar 61 and bottom face of the pin retainer 93 as shown in Fig. 4. The driving collar 84 will then rotate freely about the thrust collar until the resistance to rotation has been removed and a new shear pin 86 inserted for reconnecting the collar 84 in drive with the collar 61. This is effected by applying a wrench to the head 95 of the retainer 93 and unscrewing it from the threaded opening 89. When the retainer is removed the sheared end 96 of the pin is readily dislodged and even though the severed end has become battered or otherwise deformed, it drops freely from the bore 94 of the retainer. The other end 87 of the pin is readily discharged from the slightly oversized opening 88 by turning the parts to the position shown in Fig. 5. Thus it is obvious that the removal of the parts 87 and 96 of the shear pin does not require a punch, hammer or like tool.

A new pin 86 is readily inserted by registering the threaded opening 89 with the opening 88 and inserting the new pin through the threaded opening into the opening 88. The pin retainer 93 is then placed over the projecting end of the pin so that that end of the pin passes into the bore 94, and form a guide for the retainer when the retainer is screwed into the threaded opening to complete the connection.

After the machine has been in use for some time, and wear occurs between the teeth of the respective gears, the play is readily taken up to keep the gears in proper relation by removing the screws 43 and 68 after which the bearing sleeves 25 and 27 may be rotated to move them in or out depending upon desired position of the gears in the gear housing. For example, when the bearing sleeve 25 is turned within the housing the inner end face thereof bears against the thrust washer 55 which in turn bears against the shroud 54 to move the pinion shaft in the direction of the shaft 6, likewise the gear 30 may be adjusted by turning the bearing sleeve 27 within the hub 26 of the gear housing. After adjustment, the locks 41 and 66 are replaced with arcuate edges thereof engaging in one of the registering grooves 39 and 65. The screws 43 and 68 are then replaced to tilt or cant the locks in binding engagement with the parts.

It is obvious that adjustment of the bearing sleeve 25 for the pinion shaft 12 causes the entire assembly to shift as a unit maintaining the same relationship of the bearing sleeve with the shaft 12, the thrust collar 61 with the pinion shaft, and the universal joint collar 84 with the thrust collar. This is because the thrust collar 61 is retained between the shoulder 58 and the lock ring 81.

From the foregoing it is obvious that I have provided a power driven and portable auger of simple and relatively inexpensive construction. However, the parts are of rugged character and remain serviceable under severe operating conditions.

It is also obvious that the working parts are protected from excessive loads by the safety device or shear pin 86 and when sheared, the parts of the shear pin 86 are readily removed and replaced with a new shear pin when required.

What I claim and desire to secure by Letters Patent is:

1. In an apparatus of the character described, a shaft member, a collar member on the shaft member, one of said members having a recess and the other having a lug engaging in said recess to form a driving connection between said members, a drive member on the shaft member and having a collar portion surrounding the collar member, and a safety connection between the collar portion and the collar member to effect a releasable driving connection between the driving member and the collar member, said safety connection comprising a shear pin having one end engaging in an opening in the collar member, and a separate retaining member having a threaded connection with a larger opening in the collar portion and having an axial bore for containing the other end of said shear pin.

2. In an apparatus of the character described, a gear casing, a bearing sleeve having threaded connection with the casing, a pinion shaft rotatable in the bearing sleeve, a pinion on the pinion shaft and having a shroud connecting teeth on the pinion and forming a shoulder in thrust relation with an end of the bearing sleeve, said pinion shaft having a terminal of reduced diameter projecting from the gear housing and forming a shoulder, a thrust collar on said terminal and having a drive connection with the shoulder of the pinion shaft, a universal joint member on said terminal and having a collar portion encircling the thrust collar, said terminal of the pinion shaft having an annular groove intermediate the universal joint member and the thrust collar, a locking ring in said groove engaging the thrust collar to maintain said driving connection, and a shear connection between said collar portion and the thrust collar to form a driving connection therebetween.

3. In an apparatus of the character described, a gear casing, a bearing sleeve having threaded connection with the casing, a pinion shaft rotatable in the bearing sleeve, a pinion on the pinion shaft and having a shroud connecting teeth of the pinion and forming a shoulder in thrust relation with an end of the bearing sleeve, said pinion shaft having a terminal of reduced diameter projecting from the gear housing and forming an annular shoulder, a thrust collar on said terminal and having a drive connection with the annular shoulder of the pinion shaft, a universal joint member on said terminal and having a collar portion encircling the thrust collar, said terminal of the pinion shaft having an annular groove intermediate the universal joint member and the thrust collar and a locking ring in said groove engaging the thrust collar to maintain said driving connection with the pinion shaft, a shear pin having one end engaging in an opening of the thrust collar, and a pin retainer having threaded engagement in an opening of the collar portion of the universal joint member and provided with a bore for containing the other end of the shear pin whereby the shear pin provides a driving connection between the universal joint member on the thrust collar.

4. In an apparatus of the character described, a gear casing, a bearing sleeve having threaded connection with the casing for adjustment therein, a pinion shaft rotatable in the bearing sleeve, a pinion on the pinion shaft and having a shroud connecting teeth of the pinion and forming a shoulder in thrust relation with an end of the bearing sleeve, a thrust collar on said pinion shaft and having a driving connection with the pinion shaft, a universal joint member on said pinion shaft and having a collar portion encircling the thrust collar, said pinion shaft having an annular groove intermediate the universal joint member and the thrust collar, a locking ring in said groove engaging the thrust collar to maintain said driving connection with the pinion shaft and whereby the pinion shaft, thrust collar and universal joint member shift as a unit upon said threaded adjustment of the bearing sleeve in the gear casing, a shear connection between the thrust collar and said collar portion of the universal joint member, and means for locking the bearing sleeve in adjusted position.

5. An apparatus as described in claim 4 wherein the lock means includes a washer and the bearing sleeve has a longitudinal groove engageable with said side of the washer, and a fastening device securing the washer to the gear casing.

6. In an apparatus of the character described, a gear casing, a bearing sleeve having threaded connection with the casing, and a pinion drive unit including a pinion shaft rotatable in the bearing sleeve, a pinion on the pinion shaft and having a shroud connecting teeth of the pinion and forming a shoulder in thrust relation with an end of the bearing sleeve, said pinion shaft having a terminal of reduced diameter projecting from the gear housing and forming an annular shoulder, a thrust collar on said terminal and having a drive connection with the annular shoulder of the pinion shaft, a universal joint member on said terminal and having a collar portion encircling the thrust collar, said terminal of the pinion shaft having an annular groove intermediate the universal joint member and the thrust collar and a locking ring in said groove engaging the thrust collar to maintain said driving connection with the pinion shaft, a shear means connecting the thrust collar with the collar portion of the universal joint member, said bearing sleeve having an end projecting from the gear casing by which the bearing sleeve may be shifted in the gear casing to adjust the pinion drive unit, said projecting end of the bearing sleeve having an annular series of V-grooves, a lock washer having a side edge engaged in one of the V-grooves and a fastening device extending through the washer and into the casing to cant the washer against the bearing sleeve for retaining adjustment of said unit.

7. In an apparatus of the character described, a shaft member, a collar member on the shaft member and having a driving connection therewith, a driving member on the shaft member and having a portion projecting over the collar member, said collar member having a radial opening and the projecting portion having a larger opening in registry therewith and provided with internal threads, a shear pin having one end contained in the radial opening in the collar member and the other end projecting through the larger opening for forming a guide portion, an externally threaded retainer for engaging said threads to engage the projecting end of the shear pin whereby said end of the pin forms a guide when the retainer is threaded into said opening to cooperate with said shear pin in forming a releasable driving connection between the driving and collar members.

8. An apparatus of the character described, a shaft member, a collar member on the shaft member, a driving connection between said members, a driving member on an end of the shaft member and having a portion projecting over the collar member, said collar member having a radial opening and the projecting portion of the driving member having a larger opening provided with internal threads, a shear pin having one end contained in the radial opening of the collar member and the other end extending into the larger opening, and an externally threaded retainer engaging said threads to close the larger opening and having a recess containing the other end of the shear pin to cooperate with the shear pin in forming a driving connection between the driving member and the collar member and to retain the driving member on the shaft member until the load on the shaft member exceeds the strength of the shear pin when the apparatus is in use.

9. In an apparatus of the character described, a shaft member, a collar member on the shaft member, a driving connection between the shaft and collar members on one side of the collar member, means on the shaft member and engaging the opposite side of the collar member to retain the collar member on the shaft member, said collar member having a radial opening, a driving member on an end of the shaft member and having an annular portion surrounding the collar member and said annular portion having a larger opening adapted to register with the opening collar member, and having internal threads, a shear pin having one end engaging in the radial opening in the collar member and the other end projecting into the internally threaded opening, a retainer having external threads engaging the internal threads of the larger opening to close said opening and having a recess containing the other end of the shear pin to cooperate with the shear pin in retaining the driving member on said end of the shaft and to provide a releasable connection when an overload is applied to the shaft member.

References Cited in the file of this patent

UNITED STATES PATENTS

| | | |
|---|---|---|
| 912,488 | Richards | Feb. 16, 1909 |
| 1,671,682 | Norris | May 29, 1928 |
| 2,388,186 | Rowsey | Oct. 30, 1945 |
| 2,462,647 | Koza | Feb. 22, 1949 |